United States Patent [19]

McGeough

[11] Patent Number: 4,487,671
[45] Date of Patent: Dec. 11, 1984

[54] METHODS AND APPARATUS FOR THE ELECTRICAL MACHINING OF A WORKPIECE

[75] Inventor: Joseph A. McGeough, Aberdeen, Scotland

[73] Assignee: National Research Development Corporation, London, England

[21] Appl. No.: 368,091

[22] Filed: Apr. 13, 1982

[30] Foreign Application Priority Data

Apr. 15, 1981 [GB] United Kingdom ............... 8111907

[51] Int. Cl.³ .............................................. B23P 1/04
[52] U.S. Cl. ............................. 204/129.1; 204/224 M; 219/69 M
[58] Field of Search .................... 204/129.46, 129.43, 204/129.5, 129.1, 129.7, 224 M, 225, 228; 219/69 W, 69 D, 69 M

[56] References Cited

U.S. PATENT DOCUMENTS

| 3,284,326 | 11/1966 | Martin | 204/129.75 |
|---|---|---|---|
| 3,331,760 | 7/1967 | Powell | 204/129.75 X |
| 3,417,006 | 12/1968 | Inoue | 204/224 M |
| 3,436,331 | 4/1969 | Dietz et al. | 204/224 M |
| 3,440,156 | 4/1969 | Dickson | 204/224 M |
| 3,472,993 | 10/1969 | Gromov et al. | 219/69 D |
| 3,928,163 | 12/1975 | Ullmann et al. | 219/69 W X |
| 4,052,583 | 10/1977 | Inoue | 219/69 W |
| 4,097,710 | 6/1978 | Maillet | 219/69 D |
| 4,134,807 | 1/1979 | Brifford | 204/129.5 |
| 4,147,609 | 4/1979 | Sulin et al. | 204/224 M |
| 4,205,213 | 5/1980 | Inoue | 219/69 W |
| 4,263,116 | 4/1981 | Inoue | 204/225 X |
| 4,322,595 | 3/1982 | Fowell et al. | 204/69 C |
| 4,331,524 | 5/1982 | Matthes | 204/129.43 X |
| 4,347,423 | 8/1982 | Katsube et al. | 219/69 W |

FOREIGN PATENT DOCUMENTS

| WO79/00379 | 6/1979 | PCT Int'l Appl. . | |
|---|---|---|---|
| WO79/00380 | 6/1979 | PCT Int'l Appl. . | |
| 563360 | 8/1944 | United Kingdom . | |
| 637872 | 5/1950 | United Kingdom . | |
| 905719 | 9/1962 | United Kingdom . | |
| 1129268 | 10/1968 | United Kingdom . | |
| 1136956 | 12/1968 | United Kingdom . | |
| 1187736 | 4/1970 | United Kingdom . | |
| 1323968 | 11/1971 | United Kingdom | 219/69 C |
| 1338221 | 11/1973 | United Kingdom . | |
| 1492027 | 11/1974 | United Kingdom | 219/69 C |
| 1445133 | 8/1976 | United Kingdom . | |
| 1505065 | 3/1978 | United Kingdom . | |
| 2041813 | 9/1980 | United Kingdom . | |

OTHER PUBLICATIONS

Engineering Outline 90, Electrical Machining Methods, UDC 621.9, Sep. 15, 1967, pp. 435 to 436.
IRD Newsletter, Computer Aided Draughting New Inexpensive Approach No. 40, Jan. 1982, 4 pages.
IRD Newsletter, IRD Services Go Offshore, No. 35, May 1978, pp. 1 and 2.
Domestic Appliances, Electrical Production Processes, Electrical Engineers' Reference Book, 13th Edition, Butterworths, pp. 24-19 to 24-21.

Primary Examiner—G. L. Kaplan
Assistant Examiner—Nam X. Nguyen
Attorney, Agent, or Firm—Cushman, Darby & Cushman

[57] ABSTRACT

In combining electrical discharge machining (EDM) and electrochemical machining (ECM) the use of a strong electrolyte has, in the invention, been found possible. In one embodiment a pulse generator applies an intermittent voltage between an electrode and a workpiece causing both EDM and ECM to take place when a strong electrolyte is interposed in the gap between the electrode and the workpiece. At the onset of arcing a discharge monitor removes the voltage. A wire-cutting machine and method combining EDM and ECM are also described.

1 Claim, 8 Drawing Figures

METHODS AND APPARATUS FOR THE ELECTRICAL MACHINING OF A WORKPIECE

FIELD OF THE INVENTION

The present invention relates to methods and apparatus for removing material electrically from a conducting workpiece. The invention is particularly, but not exclusively, related to wire cutting methods and apparatus.

BACKGROUND OF THE INVENTION

The electrodischarge (EDM) and electrochemical (ECM) machining processes have been developed in recent years primarily to overcome the problems associated with hard, heat-resistant alloys which are difficult to machine by traditional methods. The former process removes metal by the erosive effect of electric sparks, discharged across a dielectric, whilst the latter relies on electrolytic dissolution from an anodic workpiece, the gap between that electrode and the cathode tool being filled with electrolyte. Although EDM yields higher dimensional accuracy than ECM, it is a slow process and the workpiece is normally left with its surface layers metallurgically damaged by the formation of a heat-affected zone. On the other hand, ECM gives a lower dimensional accuracy. This process is usually capable of higher metal removal rates than EDM and it leaves hardly any deleterious effect on the surface properties of the material; indeed, a smooth bright surface finish is a common feature of ECM.

In shaping a workpiece by ECM the workpiece and tool are made the anode and cathode, respectively, of an electrolytic cell and a potential difference is applied across the electrodes. The rate of dissolution of metal from the anode is approximately in inverse proportion to the distance between the electrodes, as a consequence of Ohm's law.

As ECM proceeds, and with the cathode-tool being driven towards the anode, usually at a constant rate, the gap width along the electrode length gradually tends to an equilibrium value, typically 0.5 mm. Under those conditions, a shape roughly complementary to that of the cathode is reproduced on the anode workpiece. Since the only electrolytic reaction at the cathode is gas evolution, there is no tool wear.

Some of the main features of EDM are now mentioned briefly. The electrode and workpiece are separated by a small gap, typically 100 $\mu$m, filled with dielectric fluid such as paraffin or light oil. An applied voltage, usually about 80 V, is applied across the gap. Current flow of the order of 1 mA results on the formation of a dielectric vapour bubble, due to Joule heating. The presence of the gas vapour plays a significant part in the sparking action in EDM. After an "ignition delay", typically of about 0.1 to 5 $\mu$s, breakdown occurs. Sparking then takes place across the inter-electrode gap but in order to prevent arcing, the voltage is removed after a short interval. A further short interval is then allowed to elapse before the next voltage pulse so that the fluid in the inter-electrode gap can de-ionise.

The consequence of a series of voltage pulses applied across the gap is the production of a set of random discrete discharges. The discharges affect both anode and cathode electrodes, causing the local temperature to rise to about 4,000 to 10,000 K. This intense heat at the electrodes results in metal removal by vaporisation. Although the discharge clearly affects both electrodes, judicious choice of process conditions and tool materials can reduce wear of the electrode to as little as one percent of the workpiece. Common electrode materials which satisfy the criterion for low tool wear are high density graphite, copper and copper tungsten.

SUMMARY OF THE INVENTION

According to a first aspect of the present invention there is provided a method of removing material from a workpiece, including arranging an electrode and an electrically conductive workpiece in close proximity but with a gap containing a strong electrolyte between the electrode and the workpiece, causing relative movement between the electrode and the workpiece, and applying an intermittent unidirectional voltage between the electrode and the workpiece in a sense which causes material to be removed from the workpiece by electrolytic action, no significant contact between the workpiece and the electrode, or any other electrode interposed in the said gap, occurring while voltage is applied between the workpiece and the electrode, and the gap dimensions and the applied voltage being such that a current carrying discharge takes place between the electrode and the workpiece at times while the voltage is applied.

Thus a machining method is provided which combines the advantages of EDM (high machining accuracy) with those of ECM (high metal removal rate and good surface finish). The machining method of the invention is of a type known as electrochemical arc machining (ECAM).

Although it has been known that EDM is preferable in some respects to ECM and vice versa, and for this reason a combination of the two processes would be advantageous, it has previously been thought that the conflicting requirements of the two systems would prevent such combination. For example while EDM requires a dielectric in the gap, ECM requires that the gap be filled with electrolyte. It would be reasonable to assume that initiation of a spark would be easier in an electrolyte than in a dielectric, since in the former case both positive ions and electrons are already present in the gap. However for a given gap width, a higher supply voltage is required to provide a given electric field with an electrolyte, since in this case a current will flow, and there will be voltage drops across other elements in the circuit. Thus it was thought that the sparks required for EDM could not be set up in a strong electrolyte, except in special circumstances where the electrode or an intermediate electrode was periodically brought into contact with the workpiece. The first aspect of the invention is based on confirmation by the present inventor that in ECAM, current carrying electrical discharges occur in the electrolyte by breakdown of gas bubbles caused by the heating effect of electrolytic current and/or chemical products of electrolytic action. For this reason the electrolyte action should preferably be such that gas is generated.

The intermittent voltage may take the form of pulses with an adjustable mark/space ratio, and the continuous voltage may be applied until the onset of arcing in the gap when the voltage is removed for an interval to allow conditions in the gap to recover.

The electrode may be oscillated in synchronism with the application of voltage so that it has oscillatory movement relative to the workpiece but in another embodiment of the method there is no movement of the electrode, except perhaps that caused by gradually feeding the electrode towards the workpiece as material is removed, to counter erosion effects.

In a modification of the method of the first aspect of the invention, the workpiece is positioned in a container and just covered with a strong electrolyte. A layer of dielectric liquid which floats on, and does not mix significantly with the electrolyte, is then formed on the electrolyte. The electrode is now moved towards the workpiece until it is in the immediate region of the interface between the electrolyte and the dielectric when material removal starts if the said unidirectional voltage is applied.

According to a second aspect of the present invention there is provided apparatus for removing material from a workpiece, comprising an electrode, positioning means for holding the electrode in close proximity to a workpiece and controlling the distance between the workpiece and the electrode, means, which are not substantially adversely affected by a strong electrolyte, for flushing electrolyte through the gap between the electrode and the workpiece, voltage application means for applying an intermittent or continuous voltage between the electrode and the workpiece in such a sense that material is removed from the workpiece by electrolytic action, the said distance controlled by the positioning means and the said voltage applied by the voltage-application means being such that current-carrying discharges also occur, at times, between the electrode and the workpiece, and monitoring means for monitoring the state of discharge occurring in the gap, and allowing sparking but not substantial arcing to occur between the electrode and the workpiece.

The monitoring means may generate a signal which is used to control the size of the gap.

The monitoring means may monitor radio frequencies (r.f.) generated in the gap, either by receiving radiation from the gap or by obtaining r.f. signals by way of connections to the workpiece and/or electrode A high r.f. level indicates sparking in the gap and a low level indicating arcing.

In order to ensure that a current-carrying discharge takes place, the positioning means preferably includes a servo mechanism for controlling the gap between the electrode and the workpiece. Preferably, the servo mechanism controls the gap to a value in the range 10 to 250 microns, a typical value being 40±10 microns.

According to a third aspect of the present invention there is provided a method for removing material from a workpiece, comprising arranging a wire electrode and an electrically conductive workpiece in close proximity, interposing an electrolyte in the gap between the electrode and the workpiece, and intermittently applying a unidirectional voltage between the electrode and the workpiece in a sense which causes material to be removed from the workpiece by electrolytic action, the gap dimensions and the applied voltage being such that a current-carrying discharge takes place between the electrode and the workpiece at times while the intermittent voltage is applied.

The wire electrode may be formed from rigid wire, or from flexible wire but when the latter is used the flexible wire is held substantially taut.

According to a fourth aspect of the present invention there is provided apparatus for removing material from a workpiece, comprising positioning means for holding a wire electrode in close proximity to a workpiece and controlling the distance between the workpiece and the electrode to cut a required shape, means for feeding the wire of the electrode in the vicinity of the gap between the workpiece and the electrode past the workpiece when the apparatus is in operation, means for interposing an electrolyte in the gap between the electrode and the workpiece, and voltage-application means for applying an intermittent or continuous unidirectional voltage between the electrode and the workpiece in such a sense that material is removed from the workpiece by electrolytic action, the said distance controlled by the positioning means and the said voltage being such that at least at times during the application thereof, a current-carrying discharge is, in operation, set up between the electrode and the workpiece.

The means for interposing an electrolyte in the gap may comprise means for surrounding the wire electrode in the region of the workpiece with a layer of liquid electrolyte. For example the wire may be fed through nozzles on either side of the region in which the workpiece is to be located and one, or both, of the nozzles may in addition to feeding the wire also be connected to means for projecting electrolyte along the wire.

The present invention can be advantageously used in such applications as hole drilling and trepanning, improvement in surface finish (removal of burrs), turning and wire cutting and disc milling. In hole drilling, feed rates can be increased from below 2 mm per minute to between typically 15 and 25 mm per minute or higher. In smoothing surfaces, ECM suffers from the disadvantage that there is a considerable loss of metal from the whole of the body being machined (stock loss). Also the size (height) of burrs that can be treated is limited to about 0.4 mm. With ECAM the problem of stock metal loss can be reduced and burrs of about 1 mm in height can be removed. Advantages of ECAM in wire cutting include improvements in cutting rate as compared with EDM wire cutting.

BRIEF DESCRIPTION OF THE DRAWINGS

Certain embodiments of the invention will now be described, by way of example, with reference to the accompanying drawings, in which.

DETAILED DESCRIPTION OF THE INVENTION

Figure 1:
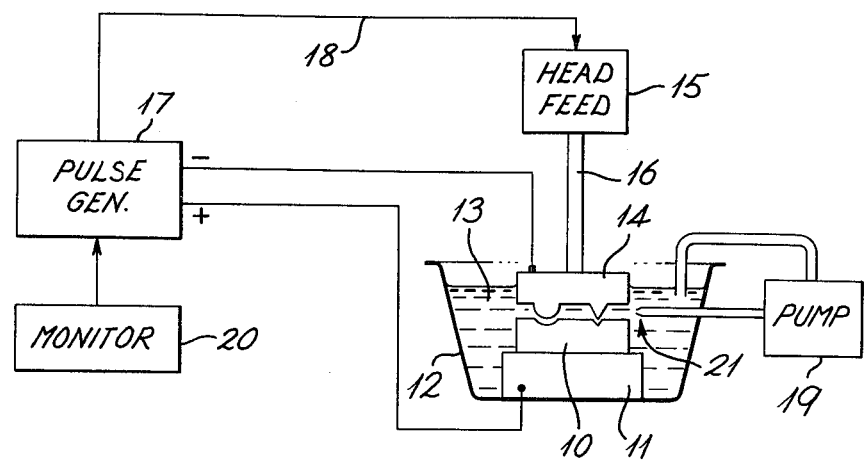
FIG. 1 is a schematic drawing of apparatus according to the invention.

In FIG. 1 a workpiece 10 supported by a holder or bolster 11 is immersed in a tank 12 containing a strong electrolyte 13 which may for example be sodium chloride solution, sodium nitrate solution or sodium silicate solution. A tool 14 is held adjacent to the workpiece 10 by a head-feed mechanism 15 with a support 16 between the working part of the mechanism and the tool 14.

A pump 19 shown schematically withdraws strong electrolyte from the top of the tank 12 and passes it to a nozzle 21 which directs the electrolyte through the gap between the electrode and the workpiece. The pressure drop from right to left across the gap should probably be between 3 and 80 bars, typically 25 bars, in order to flush away material removed from the workpiece. Since rate of material removal is much higher than in EDM much higher pressures across the gap are required. The use of a strong electrolyte means that the tank 12, the pump 19 and pipe-work must not be corroded by the electrolyte. Materials such as stainless steel may be used, or suitable protective paints may cover exposed portions.

Instead of applying the continuous, constant magnitude unidirectional voltage between the tool and the workpiece as in ECM, voltage pulses from a pulse generator 17 and of similar mark/space ratio range as is used in EDM are applied across the gap between the tool and the workpiece. The tool is connected as the cathode and the workpiece as the anode so that electrolytic action removes material from the workpiece.

In one arrangement a pulse generator 17 provides unidirectional pulses, each of a shape similar to half a sine wave. The head-feed mechanism then oscillates the tool towards and away from the workpiece at a typical frequency of 100 Hz with an amplitude of typically 0.5 mm, and the oscillation is synchronised with the pulse generator 17 by means of a connection 18 so that maximum voltage is applied when the gap is a minimum. Square wave pulses may be used instead when there is no synchronisation or the spaces in the waveform are synchronised with maximum gap size.

In another arrangement the head servo does not oscillate the tool 14 but simply feeds it towards the workpiece as metal is removed from the workpiece. In this case the electrolyte 13 can be regarded as being stagnant.

In some circumstances the tool 14 is not oscillated but nevertheless the gap requires flushing to remove debris and gases. This can be achieved in the ways already known for ECM and EDM by flushing means (not shown) which pumps electrolyte through the gap.

As in EDM, there is a danger that discharges in the gap may degenerate from sparks to arcs, and the high current which then passes can damage both the workpiece and the tool. To overcome this problem monitoring means 20 are connected to the pulse generator to interrupt the application of voltage when an arc is imminent or has just started. The monitor may receive r.f. signals from the gap either by radiation or direct connection to the workpiece and/or the electrode and interrupts the applied voltage when the r.f. signal level falls significantly. Sparking generates a much higher amplitude r.f. signal than arcing and a fall in r.f. signal level indicates the onset of arcing. Instead the monitor may receive audio signals when a reduction in audio level is an indication of the onset of arcing. The monitoring circuit described in P.C.T. Patent Application No. GB78/00052 (the basis for El-Menshawy et al U.S. application Ser. No. 154,408, filed Aug. 6, 1979) for use in EDM may be used in this embodiment of the present invention.

A more simple monitoring means may be used in which either gap voltage or current is compared with a reference, the application of voltage to the gap being interrupted when gap voltage is lower than a reference voltage or gap current is higher than a reference current since voltage falls and current rises when sparking changes to arcing.

The present inventor has discovered that a discharge takes place in a sodium nitrate electrolyte across gaps as large as 90 to 100 microns for single pulses, when the voltage is about 80 volts maximum. In contrast for EDM using a dielectric a gap of about 5 microns would be used at 80 volts. In the course of practical machining these gap values are likely to increase for both electrolytes and dielectrics. Different electrolytes alter the proportions of ECM and EDM within a pulse. Previously it was thought that with voltages of this order it was necessary for the electrode or an intermediate electrode to contact the workpiece before current carrying discharges would occur.

The tool shown in FIG. 1 has a semi-spherical projection and a cone shaped projection and as machining continues a complementary shape is formed in the workpiece 10. Since the chemical action at the cathodic tool 14 is the production of gas only, no wear occurs due to ECM. At the workpiece 10 most of the current flows in the region where the tool is near the workpiece so that most metal is removed from the projections. However some electrolytic action takes place at other places and there is a small "stock removal" from the remainder of the workpiece. Since EDM removes metal by a melting and vaporisation process due to the heat of the discharge both the tool and the workpiece lose material. This effect is minimised in EDM by correct choice of tool material but nevertheless in a pure EDM process quite an appreciable rounding of the conical projection would occur. By using ECAM stock removal is reduced as is tool wear.

Figure 2A:
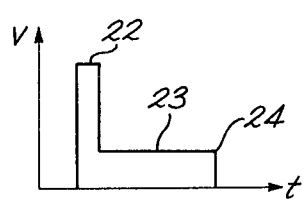
FIGS. 2a and 2b are idealised wave forms occurring in prior art EDM machines.
Figure 3A:
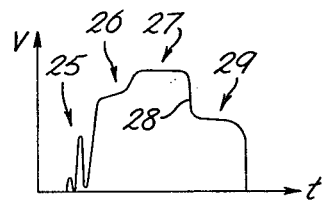
FIGS. 3a and 3b are idealised waveforms occurring in the apparatus of FIG. 1.
Figure 2B:
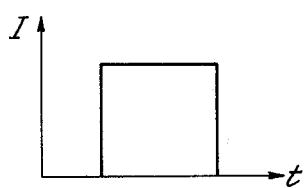
Figure 3B:
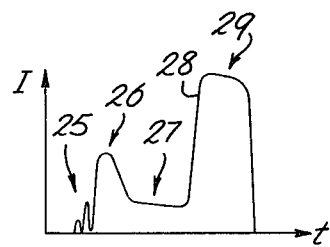

FIG. 2a shows an idealised voltage waveform of a single pulse applied to the electrode-workpiece gap in EDM. The voltage applied to the gap is initially high, at the open circuit value, as shown at 22 but falls sharply to the value indicated at 23 when sparking occurs. The current which passes across the gap is as shown in FIG. 2b. The gap voltage then remains very roughly constant until the pulse is removed at 24. Corresponding voltage and current waveforms for a single pulse in ECAM are shown in FIGS. 3a and 3b. A period 25 of rapid voltage and current oscillations occurs immediately upon the application of a voltage to the gap, possibly signifying the formation of bubbles of gas by chemical action and/or Joule heating. ECM is taking place and continues for an interval 26 but as more gas builds up the voltage rises and current falls until, in an interval 27 the gap acts as an insulator due to the pressure of gas or vapour (interval 27). The gas or vapour acts as a dielectric across which breakdown occurs. However electrolytic conduction decreases at time 27 when the gap is largely filled with vapour and ceases when the vapour breaks down at time 28. After that time sparking occurs in the gap and the current 29 flows. The current which flows up to time 28 is thus electrolytic while the current which flows later is a discharge current, the whole forming an ECAM pulse. This single pulse example may provide some indication of multiple pulse ECAM behaviour.

The production of vapour in the gap is helped by the choice of electrolyte which generates gas bubbles by chemical action. Sodium chloride solution produces a large amount of hydrogen and sodium nitrate produces little hydrogen but other gases, such as ammonia, which also aids the sparking action.

Previously, feeding the tool towards the workpiece in ECM and EDM was usually achieved by driving the shaft 16 by means of a stepper motor but this system only gave a fixed pre-set feed rate and made no provisions for variation of gap size due to variation in rate of material removal. In ECAM some adaptive control of the cathode feed rate is advantageous since erosion of the tips of cusps tends to be rapid because of high current densities due to small surface areas, whilst erosion of cusp roots is slower due to lower current densities.

Figure 4:
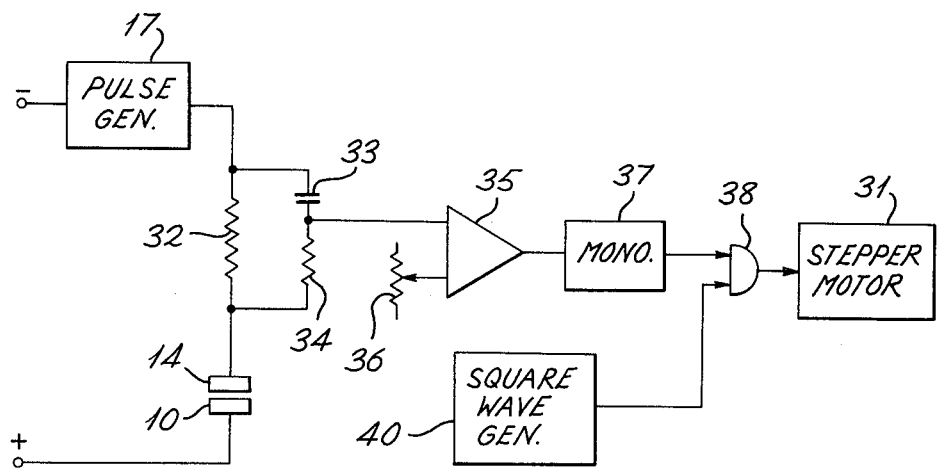
FIG. 4 is a block diagram of a circuit which may be used to control part of the apparatus of FIG. 1.

FIG. 4 shows a servo mechanism for controlling a stepper motor 31 which may be that used in a conventional head-feed mechanism of the type shown at 15 in FIG. 1. The control voltage is obtained from a resistor 32 in series with the gap between the workpiece 10 and the tool 14. The current in the gap is directly proportional to the size of the gap and thus the voltage developed across the resistor 32 is proportional to gap size. This voltage is smoothed by means of a capacitor 33 and a resistor 34 and applied to an operational amplifier 35 which also receives an adjustable reference voltage from a potentiometer 36. While the voltage across the resistor 32 is sufficiently high to provide a voltage at the operational amplifer 35 which is greater than that from the potentiometer 36, a monostable circuit 37 is prevented from triggering and therefore from enabling an AND gate 38. The monostable circuit 37 includes capacitive and resistive elements which provide a suitable pulse duration. A square wave generator 40 generates a suitable square wave for driving the stepper motor 31 and these pulses reach the stepper motor when the gate 38 is enabled and under these conditions the tool 14 is fed towards the workpiece 10 at a constant rate.

Thus when gap size increases, the voltage applied to the operational amplifier 35 falls until it is below the reference voltage from the potentiometer 36. At this time the monostable circuit 37 receives a voltage step and is triggered to provide a pulse which enables the AND gate 38. Hence the stepper motor is energised and the gap is reduced.

Adjustment of the potentiometer 36 sets the size of the tool-workpiece gap.

The following may be used in constructing a circuit according to FIG. 4:

a Signetics operational amplifier type $\mu$741 as the amplifier 35, a Signetics monostable multivibrator type S74121 as the monostable circuit 37, a Signetics AND gate type S5408 as the gate 38, a TWG generator type 500 as the square wave generator 40, and a Sigma motor type 20222 3D 200F 1.4.

Figure 5:
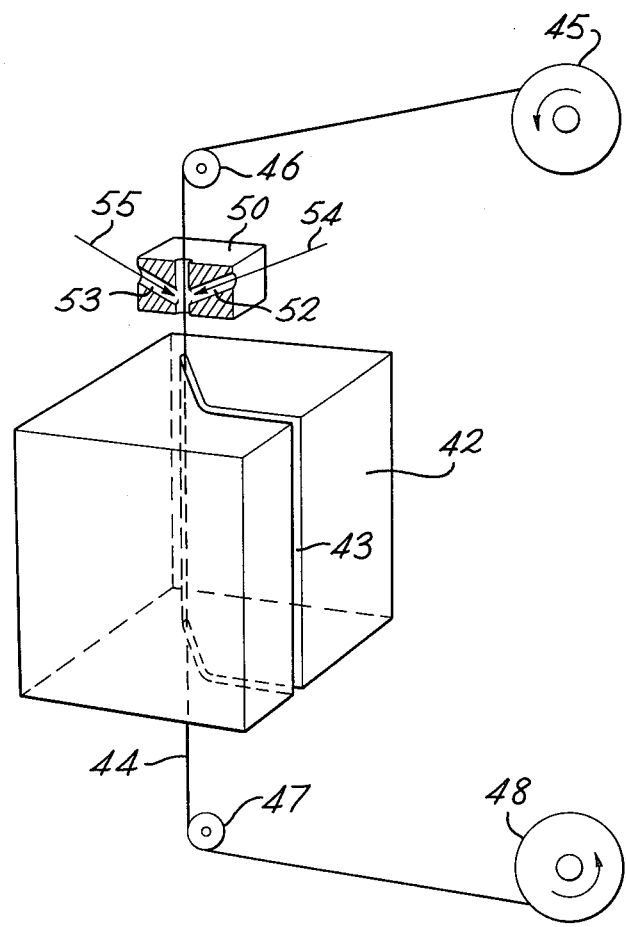
FIG. 5 is a schematic drawing of wire cutting apparatus according to the invention.

An ECAM wire cutting machine is shown diagrammatically in FIG. 5 where a workpiece 42 is shown with a slot 43 partially cut by a wire 44. The wire is fed from a spool 45 over guides 46 and 47 to a receiving spool 48. In order to provide a coaxial electrolytic layer around the wire, the wire passes through a member 50 which includes two nozzles 52 and 53 into which electrolyte, preferably a strong electrolyte, is pumped by means not shown in the direction of the arrows 54 and 55. On emerging from these nozzles into a central bore through which the wire 44 also passes, the electrolyte stream is converted to a downward column surrounding the wire. Alternatively, particularly where the workpiece is comparatively thin, the electrolyte may be flushed over the wire from a nozzle positioned at an angle to the wire.

As with the fixed tool arrangement shown above there is no need for contact between the wire and the workpiece in order for electrical discharges to take place.

The wire transport and tensioning mechanism is similar to that used in EDM wire cutting but the electrolyte pressures and velocities are, in this example, between 2 to 400 kN/m$^2$ and 2 to 4 m/s, respectively. Suitable wire diameters are in the range from 0.05 to 1 mm, preferably about 0.25 mm. The size of the gap between the wire and the workpiece is controlled in conjunction with means for moving the workpiece in relation to the wire to cut a required shape. Suitable means are known for EDM wire cutting machines but usually modifications to provide an appropriate gap in the range 100 to 250 microns are required.

Figure 6:
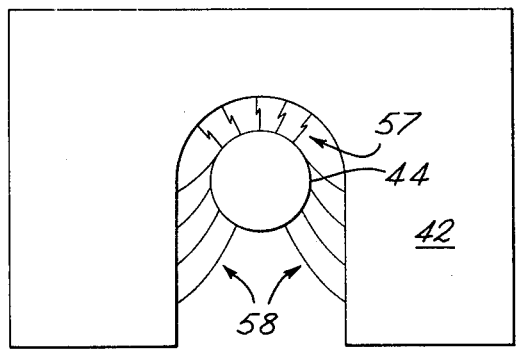
FIG. 6 is a view in the direction of the wire in ECAM wire cutting according to the invention.

Rectangular pulses with variable mark/space ratios, or rectified a.c. mains supplies, either half wave or full wave, may be applied between the wire and the workpiece. A suitable voltage is in the range 15 to 250 volts, typically 80 volts, and the maximum current is typically 30 amps. A d.c. supply may be used for finishing when a lower voltage or a bigger tool-electrode/workpiece gap is appropriate to prevent discharging and ensure only electrolytic action. However in most wire cutting such finishing is not necessary since, as is illustrated in FIG. 6, ECAM takes place ahead of the wire 44 in the zone 57 and ECM action takes place at the side and behind the wire in the zones 58.

In general where ECAM has been used to remove metal from a workpiece, ECM at a lower voltage can be used to provide a good surface finish.

Although some specific examples of the invention have been described, it will be realised that the invention can be put into practice in many other ways. For example, in relation to wire cutting, the wire electrode need not be fed past the workpiece but a non-renewed wire electrode may simply be moved in relation to the workpiece in order, for example, to cut shapes from a sheet of metal. Where renewable electrodes are required but they are of large diameter, and/or possibly brittle and therefore difficult to wind around spools (for example tungsten electrodes, copper graphite wires and tungsten carbide electrodes) a "pencil" feed system may be used. A small force periodically applied to a reciprocating member activates the "pencil" feed and causes a collet to grip the electrode or wire and move it in the feed direction. When the force is removed between periodic applications, a spring moves the collet back without the electrode or wire being gripped. Short lengths of electrode or wire are then held in a magazine and fed, as required, to the collet.

Oscillation of the wire electrode, the workpiece, or an auxiliary electrode is sometimes useful to clear debris and excess gas from the gap.

In wire cutting, monitoring means of the type described in relation to FIG. 1 may be used to control the removal of voltage from the gap when arcing is imminent or just occurs.

In addition to conventional machine shop use the invention, and in particular ECAM wire cutting, is expected to prove useful for undersea cutting purposes for example in the oil industry where sea water, composed mainly of 3% sodium chloride solution, is the electrolyte. The electrode position has to be precisely controlled, for example in one of the ways indicated above. The workpiece may be structural, for example part of an oil rig. A sealed power pack for applying voltage and for arc monitoring is then preferably located undersea near the workpiece.

In many circumstances it may not be appropriate to obtain or construct a special purpose ECAM machine and then the following method which employs a conventional EDM machine may be used. The control system of such a machine operates by monitoring the gap impedance. Using a dielectric, this impedance is very high until the onset of sparking. If the dielectric is replaced by electrolyte the servo feeds the head down until the electrode reaches the fluid surface. At this point it stops because of the low impedance between electrolyte and workpiece, and will not penetrate the fluid surface.

To avoid major alterations to the control system a non-corrosive metal tank is placed on the table of a standard EDM machine, and the workpiece is placed inside. A strong electrolyte such as sodium chloride solution (3 Molar) is poured in until the workpiece surface is about 1 mm below the surface of the electrolyte, and paraffin is then added until the workpiece is about 80 mm below the upper paraffin surface. The mixture is allowed to settle and the paraffin, being less dense than electrolyte, forms an upper layer on top of the electrolyte. The purpose of the paraffin is to prevent the thin layer of electrolyte from boiling away during machining.

In operation, using for example a 30 mm diameter graphite bar as the electrode, the control system feeds the electrode down through the paraffin until the surface of the electrolyte is reached. At this point current starts to flow, producing Joule heating and gas within the electrolyte, and machining similar to EDM but with some ECM takes place.

In one test using this method, a cavity around 2.5 mm deep was machined into a flat steel workpiece and the surface finish appeared as typical of that produced by EDM but with ECM smoothing of the craters. The surface was also bright, typical of ECM using a sodium chloride electrolyte.

The process works well using pulsed d.c. applied to the gap as in conventional EDM. A typical range of currents up to 50 A can be used, covering finishing and roughing operations. Low current pulses (under 10 A) may be supplied at 200 V and higher currents at 85 V. Long duration pulses with low duty factor appear to be preferable when machining with a pulsed supply.

As an alternative to the pulsed d.c., a voltage continuously applied across the gap appears advantageous, the voltage being interrupted when the onset of arcing is detected by, for example, r.f. monitoring. An EDM method of this type which can be modified to be suitable for ECAM is described in P.C.T. Patent Application No. GB78/00051.

I claim:

1. A method of removing material from a workpiece including
    positioning the workpiece in a container,
    just covering the workpiece with an electrolyte,
    adding a layer of dielectric liquid which floats on, and does not significantly mix with the electrolyte,
    moving an electrode towards the workpiece until the electrode is in the immediate region of the interface between the electrolyte and the dielectric liquid, and
    applying an intermittent unidirectional voltage between the electrode and the workpiece in a sense which causes material to be removed from the workpiece by electrolytic action, the dimensions of the gap between the electrode and the workpiece and the applied voltage being such that a current-carrying discharge takes place between the electrode and the workpiece at times while the voltage is applied.

* * * * *